(12) United States Patent
Hemphill et al.

(10) Patent No.: US 11,011,084 B1
(45) Date of Patent: May 18, 2021

(54) MODULAR MOUNTING SYSTEM

(71) Applicant: CHRISTIE DIGITAL SYSTEMS USA, INC., Cypress, CA (US)

(72) Inventors: Bryan Hemphill, Waterloo (CA); Darren Pastrik, Kitchener (CA)

(73) Assignee: CHRISTIE DIGITAL SYSTEMS USA, INC.

( * ) Notice: Subject to any disclaimer, the term of this patent is extended or adjusted under 35 U.S.C. 154(b) by 0 days.

(21) Appl. No.: 16/781,293

(22) Filed: Feb. 4, 2020

(51) Int. Cl.
*G09F 9/302* (2006.01)
*H01R 13/62* (2006.01)
*F16B 1/00* (2006.01)

(52) U.S. Cl.
CPC .............. *G09F 9/3026* (2013.01); *F16B 1/00* (2013.01); *H01R 13/6205* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,867,236 | A * | 2/1999 | Babuka | G02F 1/1339 349/73 |
| RE42,091 | E * | 2/2011 | Moscovitch | G06F 1/1622 361/679.04 |
| 7,918,565 | B2 * | 4/2011 | Hemphill | G06F 1/1601 353/78 |
| 7,995,332 | B2 * | 8/2011 | Ozolins | F16M 11/2014 361/679.06 |
| 8,000,090 | B2 * | 8/2011 | Moscovitch | F16M 11/2064 361/679.04 |
| 8,136,277 | B2 * | 3/2012 | Patterson | F21V 21/005 40/541 |
| 8,197,088 | B2 * | 6/2012 | Patterson | G09F 9/33 362/249.02 |
| 8,240,857 | B2 * | 8/2012 | Hemphill | G06F 1/1601 353/78 |
| 8,485,689 | B2 * | 7/2013 | Patterson | G09F 9/3026 362/249.02 |
| 8,611,072 | B2 * | 12/2013 | Adema | G09F 9/3026 361/679.01 |
| 8,681,483 | B2 * | 3/2014 | Adema | F16B 33/002 361/679.01 |
| 8,869,866 | B2 * | 10/2014 | Bauman | E05D 11/10 160/135 |
| 9,042,090 | B2 * | 5/2015 | Lu | F16M 11/2014 361/679.27 |
| 9,080,912 | B2 * | 7/2015 | Patterson | G01J 3/28 |
| 9,372,659 | B2 * | 6/2016 | Hall | F21K 9/90 |

(Continued)

*Primary Examiner* — Lisa Lea-Edmonds
(74) *Attorney, Agent, or Firm* — Perry+ Currier

(57) ABSTRACT

A coupler and a system are provided for mounting panels, such as a plurality of display tiles. According to an embodiment, the system includes a mount sheet having a plurality of mounting positions, a plurality of chassis having at least one locating feature and at least one magnetic coupler on one side and at least one magnet on an opposite side. The locating features on one side of the chassis are adapted to locate a locating feature on at least one display tile. The magnetic couplers on one side of the chassis are adapted to magnetically couple at least one magnetic coupler on a display tile. The magnet or magnets on an opposite side are adapted to magnetically couple the mount sheet in one of the mounting positions.

30 Claims, 11 Drawing Sheets

(56) References Cited

U.S. PATENT DOCUMENTS

| | | | |
|---|---|---|---|
| 9,477,438 B1 * | 10/2016 | Hochman | H01R 13/504 |
| 9,655,267 B2 * | 5/2017 | Cope | G09F 9/35 |
| 9,733,885 B2 * | 8/2017 | Patterson | G09F 9/3026 |
| 9,889,461 B2 | 2/2018 | Busman et al. | |
| 9,934,759 B1 * | 4/2018 | Cross | G06F 3/1446 |
| 10,152,293 B2 * | 12/2018 | Patterson | F21V 21/088 |
| 10,510,321 B2 * | 12/2019 | Cross | G09G 5/14 |
| 10,529,260 B2 * | 1/2020 | Hemphill | G09F 9/3026 |
| 10,635,381 B2 * | 4/2020 | Nakano | G09F 9/00 |
| 2011/0148740 A1 * | 6/2011 | Perkins | G06F 3/1446 |
| | | | 345/1.3 |
| 2011/0148741 A1 * | 6/2011 | Perkins | H04N 9/12 |
| | | | 345/1.3 |
| 2011/0148742 A1 * | 6/2011 | Perkins | G06F 3/1446 |
| | | | 345/1.3 |
| 2013/0269882 A1 * | 10/2013 | Bauman | E05D 7/1072 |
| | | | 160/135 |
| 2016/0011844 A1 * | 1/2016 | Patterson | G09F 9/33 |
| | | | 362/249.01 |
| 2017/0003925 A1 | 1/2017 | Cass | |
| 2017/0114971 A1 * | 4/2017 | Cross | G06F 3/1446 |
| 2017/0186345 A1 | 6/2017 | Hemphill et al. | |
| 2018/0359426 A1 * | 12/2018 | Adema | G06F 3/1446 |
| 2019/0070843 A1 | 3/2019 | Bauman et al. | |
| 2019/0191577 A1 * | 6/2019 | Declerck | H05K 5/0217 |
| 2019/0295459 A1 * | 9/2019 | Gou | G09F 9/33 |
| 2020/0205304 A1 * | 6/2020 | Drabant | G09F 9/3026 |
| 2020/0294471 A1 * | 9/2020 | Cross | G09G 5/14 |

* cited by examiner

MODULAR MOUNTING SYSTEM

BACKGROUND

Quickly and accurately mounting panels, and the like, to a surface can be challenging. For example, advances in display technologies have made larger displays available, but there remains a limit beyond which larger displays become increasingly technically challenging and expensive to fabricate. The same is true of displays with non-rectangular and/or irregular shapes. One solution that overcomes the size and shape limitations of individual display devices is a video wall. Video walls are display systems that comprise a plurality of local display units mounted on a surface and arranged contiguously. A single image may be divided into a plurality of images, each displayed on a local display unit such that the original image may be viewed on the display system as a whole. Video wall systems are scalable to various sizes and shapes; however, video walls provide their own challenges for installation and alignment.

One challenge of video walls is that the display units must be aligned precisely when mounted, as even slight gaps and misalignments are noticeable to the viewer. Spaces or gaps between display units may be minimized by affixing display units to neighboring display units; however, this may result in tolerance stack up, resulting from variations in the dimensions or alignment of individual units that accumulate as the number of display units increases, causing interference or gaps between neighboring display units. Other mounting systems provide dedicated supports for each display unit that allow adjustments to be made with multiple degrees of freedom to compensate for fit issues; however, these systems necessitate aligning each display unit individually and verifying the accuracy of each alignment. This is a time-consuming and cumbersome process which increases the likelihood of damage occurring to the display units.

A further challenge of video walls is that temperature fluctuations during operation may cause the components to expand. The temperature of an LED display unit may increase by approximately 50° C. when the unit displays a fully white image. If neighboring video display units are installed such that they abut one another, temperature fluctuations may inflict internal stress on the assembly.

SUMMARY

Generally, according to an aspect of the present specification, a coupler is provided for mounting a panel to a surface, comprising at least one male locating feature on one of either the panel or surface adapted to locate at least one female locating feature on the other of the panel or surface, and at least one magnetic coupler on each of the panel and surface adapted to magnetically couple the panel and surface in an orientation defined by the male and female locating features.

According to another aspect of the present specification, a system for mounting a plurality of display tiles is provided comprising a mount sheet having a plurality of mounting positions, a plurality of chassis having at least one locating feature and at least one magnetic coupler on one side and at least one magnet on an opposite side. The locating features on one side of the chassis are adapted to locate a locating feature on at least one display tile. The magnetic couplers on one side of the chassis are adapted to magnetically couple at least one magnetic coupler on a display tile. The magnet or magnets on an opposite side are adapted to magnetically couple the mount sheet in one of the mounting positions.

The magnetic couplers on the chassis may be one or more magnets or ferromagnetic material. The magnetic couplers on the display tile may be one or more magnets or ferromagnetic material.

Each locating feature on one side of the chassis may be either a male locating feature or a female locating feature adapted to locate a female locating feature or a male locating feature, respectively, on one of the display tiles.

The male locating feature may comprise at least one locating pin. The female locating feature may comprise at least one socket that is adapted to receive a locating pin.

Each display tile may include two locating features corresponding with two locating features on one of the chassis. The two female locating features may include a first and second socket disposed on an axis: a hole socket and a slot socket. The hole socket may have an inner diameter and the slot socket may have an inner height and an inner width. The two male locating features may include a first and second locating pin, each having an outer diameter and being adapted to couple with a corresponding socket of the two female locating features.

The inner diameter of the hole socket may be dimensioned relative to the outer diameter of the corresponding locating pin to create a close fit. The inner height of the slot socket may be dimensioned relative to the outer diameter of the corresponding locating pin to create a close fit. The inner width of the slot socket may be greater than the outer diameter of the corresponding locating pin. Movement of the locating pin coupled with the slot socket may be permitted in the axis, and rotational movement of the first and second sockets around the corresponding locating pin may be impeded.

The chassis may include at least one locating pin on the opposite side for positioning the chassis relative to at least one aperture on the mount sheet.

The one or more locating pins on the opposite side of the chassis may have an outer diameter and may correspond with one of the apertures on the mount sheet. The aperture may have an inner width and an inner height. The outer diameter of the locating pin may be less than the inner width and the inner height of the corresponding aperture.

The chassis may have two locating pins on the opposite side. The two locating pins may be disposed on an axis of the chassis.

The display system may further comprise two springs connected to the first locating pin on the opposite side of the chassis, the first spring on the first locating pin configured to bias the first locating pin in a direction perpendicular to the axis, and the second spring on the first locating pin configured to bias the second locating pin in the axis. A further spring may be connected to the second locating pin on the opposite side of the chassis and configured to bias the second locating pin in a direction perpendicular to the axis. Movement of the second locating pin on the opposite side of the chassis may be permitted in the axis, and rotational movement of the chassis around either locating pin may be impeded.

The springs may be selected from a group comprising: elastomers, leaf springs, coil springs, or a combination thereof.

Each chassis may include three pairs of locating features adapted to locate corresponding pairs of locating features on three display tiles. Each chassis may further include three magnetic couplers adapted to magnetically couple with the magnetic couplers on three display tiles.

Each display tile may include a carrier and a module board.

The mount sheet may be removably attached to a support surface with one or more anchors. The anchors may be positioned between the mount sheet and the support surface.

According to another aspect of the present specification, a system for mounting a plurality of display tiles is provided comprising a mount sheet having a plurality of mounting positions; and a plurality of chassis. Each display tile has two locating features on one side adapted to couple two locating features on the chassis. Two locating features on one side are either male locating features or female locating features adapted to locate two female locating features or two male locating features, respectively, on the display tile. Each male locating feature comprises a locating pin. Each female locating feature comprises a socket that is adapted to receive the locating pin. Each chassis includes a magnet or a ferromagnetic material adapted to magnetically couple with a ferromagnetic material or magnet, respectively, on the display tile The female locating features may include a first or second socket disposed on an axis: a hole socket or a slot socket. The hole socket may have an inner diameter and the slot socket may have an inner height and inner width. The male locating features may include a locating pin having an outer diameter and being adapted to couple with a corresponding socket of the female magnetic coupler. The inner diameter of the hole socket may be dimensioned relative to the outer diameter of the corresponding locating pin to create a close fit. The inner height of the slot socket may be dimensioned relative to the outer diameter of the corresponding locating pin to create a close fit. The inner width of the slot socket may be greater than the outer diameter of the corresponding locating pin. Movement of the locating pin coupled with the slot socket may be permitted in the axis, and rotational movement of either socket around the corresponding locating pin may be impeded.

Each chassis may include two locating pins on the opposite side for positioning the chassis relative to two apertures in the mount sheet. Each locating pin may correspond with one of two apertures on the mount sheet. Each locating pin may have an outer diameter and may be disposed on an axis of the chassis. Each aperture may have an inner width and an inner height, and the outer diameter of the each locating pin may be less than the inner width and the inner height of the corresponding aperture.

The display system may further comprise two springs connected to the first locating pin on the opposite side of the chassis, the first spring on the first locating pin configured to bias the first locating pin in a direction perpendicular to the axis, and the second spring on the first locating pin configured to bias the second locating pin in the axis. A further spring may be connected to the second locating pin on the opposite side of the chassis and configured to bias the second locating pin in a direction perpendicular to the axis. Movement of the second locating pin on the opposite side of the chassis may be permitted in the axis, and rotational movement of the chassis around either locating pin may be impeded.

BRIEF DESCRIPTION OF THE DRAWINGS

Reference will now be made, by way of example only, to the accompanying drawings in which.

DETAILED DESCRIPTION OF THE EMBODIMENTS

Figure 1:
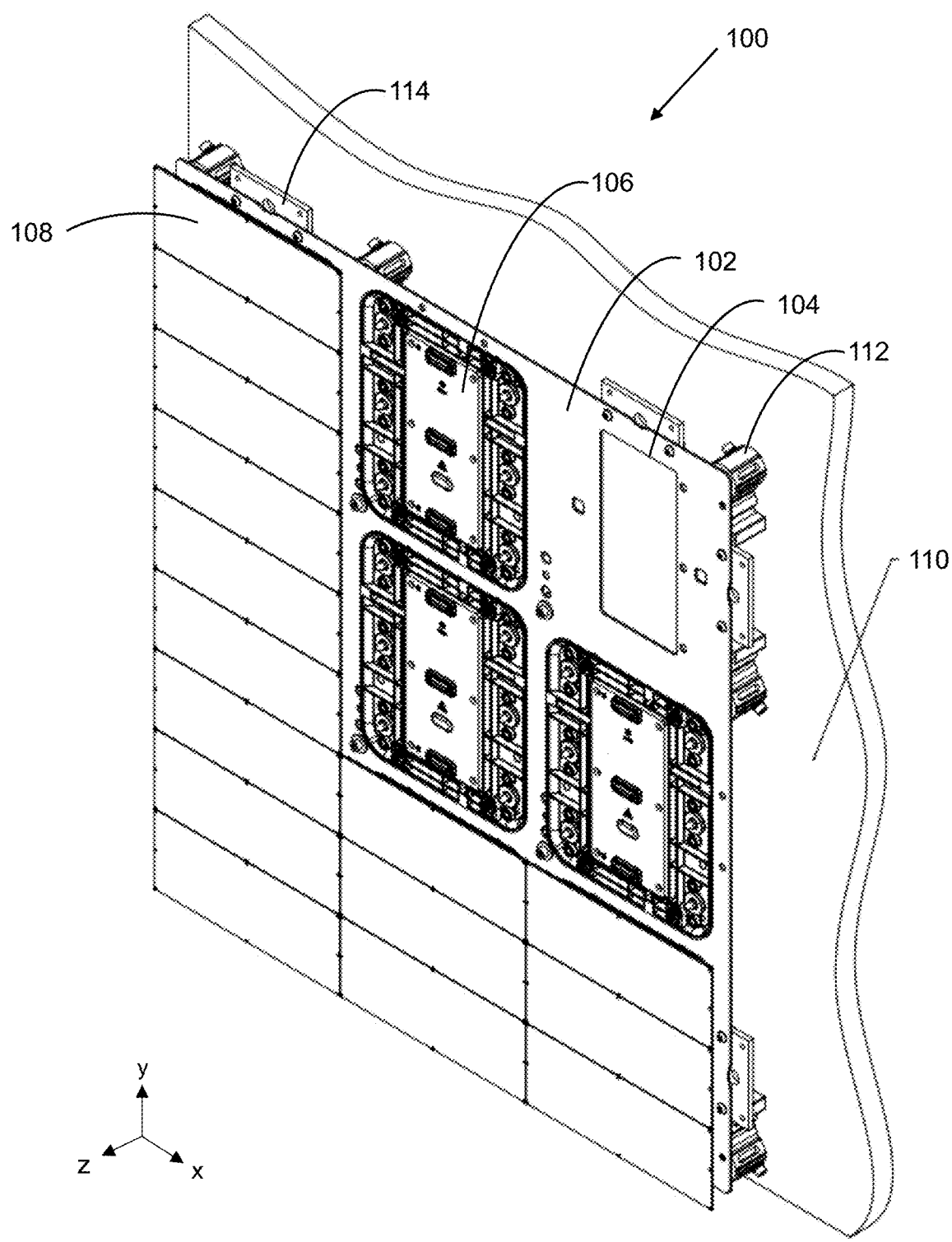
FIG. 1 is a partial perspective view of a system for mounting video display tiles, according to an embodiment.

To address the challenges in the installation and alignment of panels, such as tiled display systems, there is provided a system 100 for mounting a plurality of panels, such as display units, as shown in FIG. 1, which includes xyz Cartesian indicators to generally indicate direction, for clarity. System 100 comprises a mount sheet 102 which is substantially two-dimensional, for example in the xy-directions. Mount sheet 102 is substantially two-dimensional in the sense that two of its dimensions (e.g. in the x and y directions) are larger than the third dimension (e.g. in the z direction). The mount sheet 102 may have a surface or a plane which may have a profile including but not limited to a flat profile, a curved profile, a bent profile, and a faceted profile.

The mount sheet 102 has a plurality of mounting positions 104, each at a predetermined position on mount sheet 102.

Each mounting position 104 is configured to receive at least one chassis 106. The mounting positions 104 may comprise apertures or cut-outs shaped and sized to receive at least a portion of a corresponding chassis 106. Each chassis 106 is adapted to magnetically couple with the mount sheet 102 in one of the mounting positions 104.

Each chassis 106 is further adapted to magnetically couple at least one display tile 108. Display tiles receivable by the chassis 106 may comprise, but are not limited to, LED displays, LCD displays, plasma displays, front and/or rear projection displays and the like. Indeed, any type of display unit which may be used in tiled display systems is within the scope of the present specification.

System 100 may hence enable the installation of a large number of display tiles 108. By pre-determining the positions of chassis 106, the display tiles 108 received by those chassis 106 may be aligned with one another to within a given inter-display unit tolerance. This may obviate after-mounting alignment and/or xyz alignment of the display units with one another during the installation process. By coupling the chassis 106 to the display units 108 and mounting sheet 102 with at least one magnetic coupler (such as couplers 507a, 507b, 507c, 507d and 601a, 601b, 601c, 601d, discussed in greater detail below), the chassis 106 and display tiles 108 may be installed without fasteners such as bolts, screws, clamps, or snaps. Consequently, a relatively shorter duration of time, relative to the prior art, may be used to install a large number of display units and the assembled tiled display system may be characterized by tighter tolerances between display units than in the prior art.

Furthermore, the mount sheet 102 may be installed and have its profile adjusted and finalized during the construction phase of a space that is to house the tiled display system, without exposing sensitive and expensive display units to potential damage during the construction phase. Once the construction is finished, the chassis 106 may be secured and/or mounted to the mount sheet 102 at their respective mounting positions 104 without further alignment, individually or collectively, of the chassis 106. Similarly, the display tiles 108 may be secured and/or mounted to the chassis 106 without further alignment, individually or collectively, of the chassis 106.

The mount sheet 102 may be secured to a support surface 110 with one or more anchors 112. The anchors 112 may be positioned between the support surface 110 and the mount sheet 102. A plurality of mount sheets 102 may be secured to a support surface 110. Adjacent mount sheets 102 may be coupled with one or more coupling links 114. An anchor 112 may comprise any suitable spacer and/or fastener, such as a bolt, a screw, and the like, configured to secure a mount sheet 102 to the support surface 110.

Figure 2:
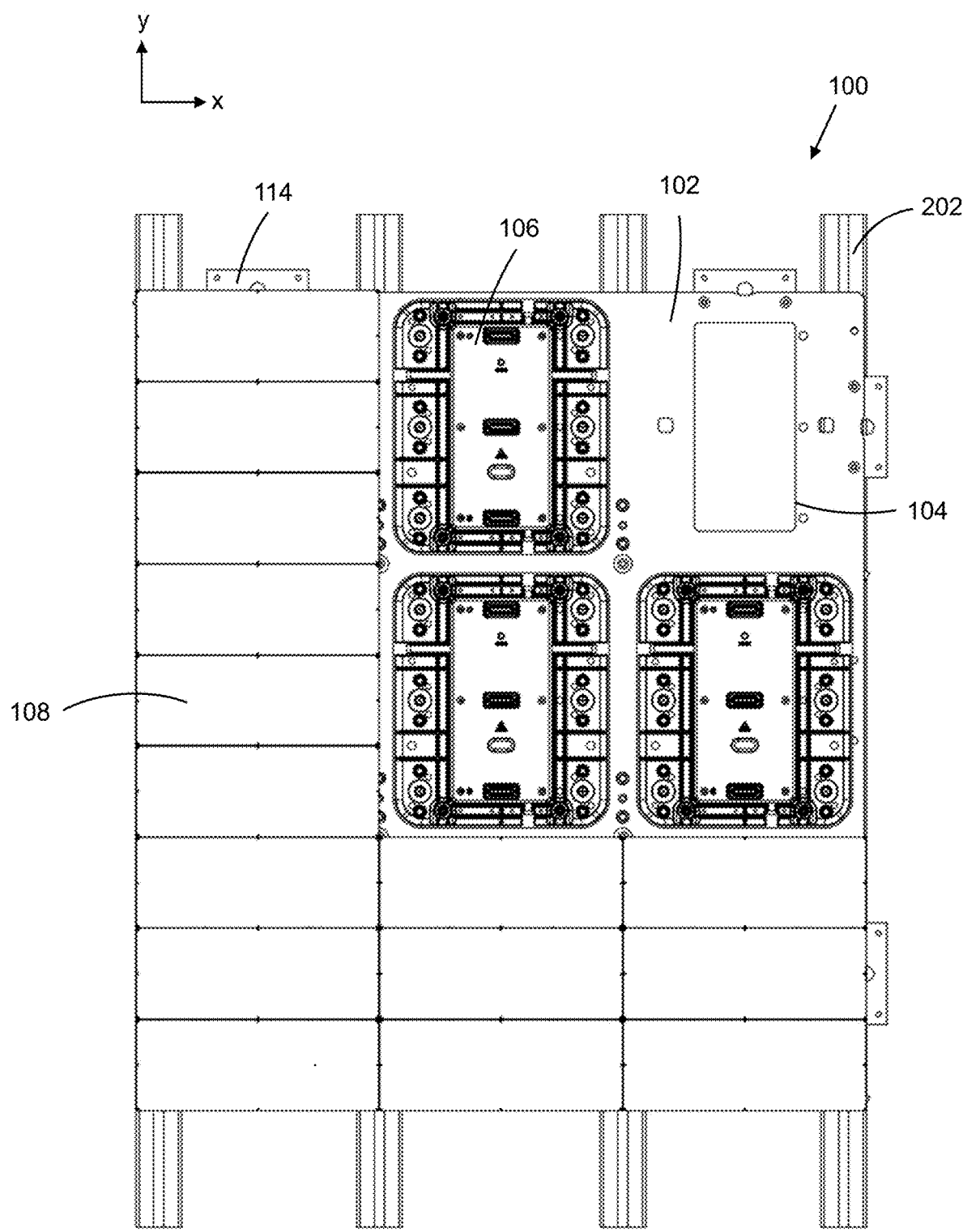
FIG. 2 is a partial front view of the system of FIG. 1 secured to a frame.
Figure 3:
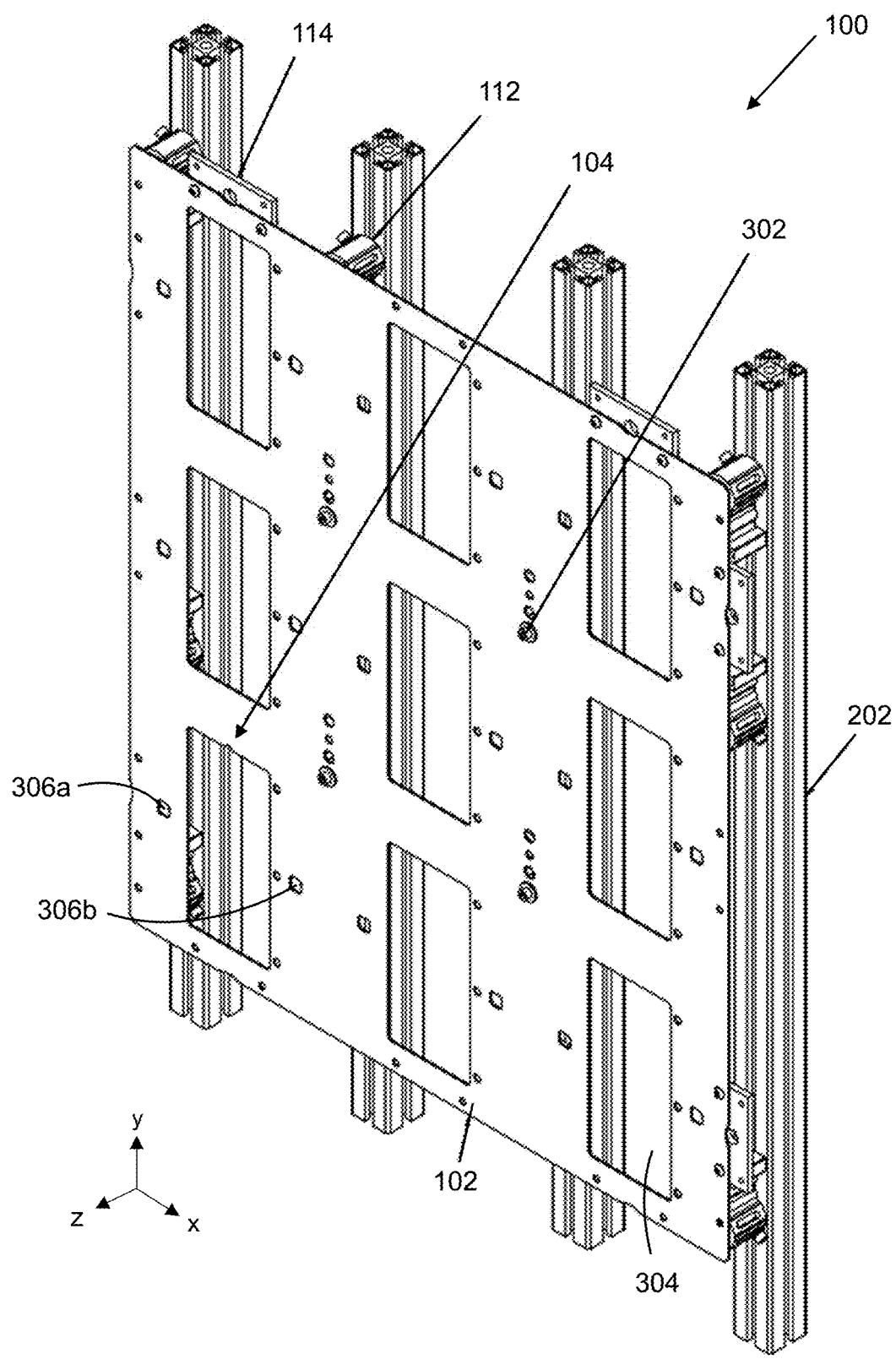
FIG. 3 is a partial perspective view of a mount sheet of the system of FIG. 1.
Figure 4:
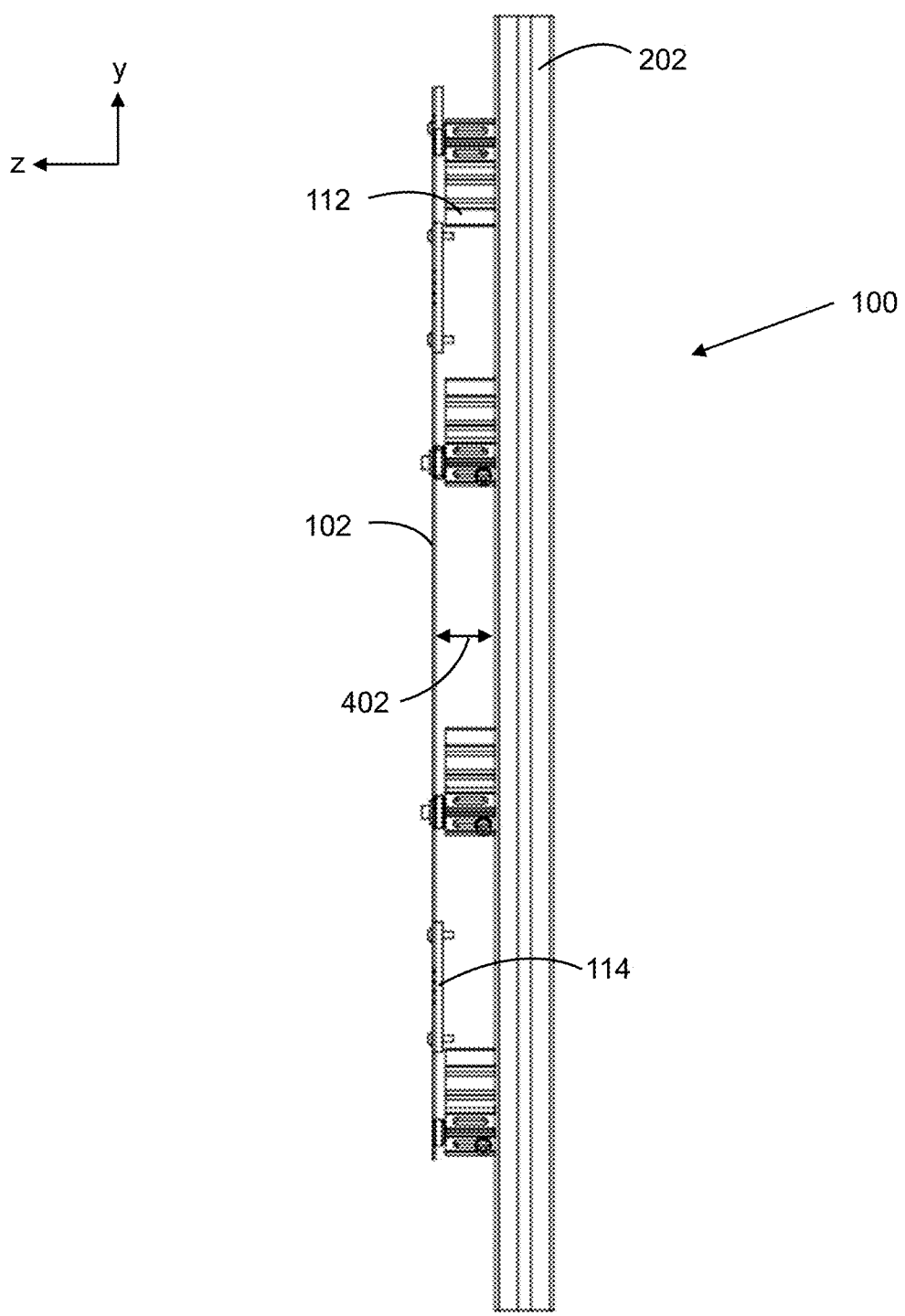
FIG. 4 is a side view of the system of FIG. 1.

The support surface 110 may comprise a load bearing support surface including, but not limited, to a wall (as depicted in FIG. 1) and/or a frame 202 (as depicted in FIGS. 2-4). However, while the support surface 110 is depicted as flat and vertical, the support surface 110, and/or any other suitable surface and/or frame, need not be flat and/or vertical. In some configurations, components of the system 100 may be secured to a horizontal, slanted, or curved surface, for example. In some examples, the system 100 may be installed on a support surface that is inclined, for example at angles in the range of from 5° to 20°.

The system 100 may be assembled by first mounting various chassis 106 in mount positions on the mount sheet 102. Display tiles 108 may then be mounted to the chassis using the magnetic couplers, such as couplers 507a, 507b, 507c, 507d and 601a, 601b, 601c, 601d. However, the steps need not be performed in any particular order. The steps may be repeated and/or reversed. In one example, display tiles may be mounted on a chassis and the chassis may then be mounted on the mount sheet.

FIG. 2 shows a partial front view of the system for mounting display tiles 100 secured on a frame 202. FIG. 2 also includes xy Cartesian indicators to generally indicate direction.

FIG. 3 shows a partial perspective view of the system for mounting display tiles 100. In this example, the mount sheet 102 is secured to a frame 202 by the anchors 112. The anchors 112 are secured to the mount sheet 102 by fasteners 302. These fasteners 302 may include, but are not limited to, screws, bolts, magnets, clamps, snap-fittings, and the like.

In this system 100, each mount position 104 includes a cut-out 304 configured to accommodate a portion of the chassis 106 (shown in detail in FIG. 7) and a pair of apertures 306a, 306b configured to receive the chassis 106 (shown previously in FIG. 1). The mount sheet 102 may comprise a ferromagnetic material.

FIG. 4 shows a side view of the system for mounting display tiles 100. FIG. 4 also includes y and z Cartesian indicators to generally indicate direction. In FIG. 4, similar to FIG. 3, the mount sheet 102 is secured to a frame 202. In this system 300, the anchors 112 are positioned between the frame 202 and the mount sheet 102, leaving a distance 402 between the mount sheet 102 and the frame 202. The distance 402 between the mount sheet 102 and the frame 202 may be configured to accommodate a portion 710 of the chassis 106 (shown later in FIG. 7) that is received by the cut-out 304 (previously depicted in FIG. 3). It is contemplated that the distance 402 between the mount sheet 102 and the frame 202 may be sufficient to allow air to circulate and cool the system 100. By independently adjusting the anchors 112, the mount sheet 102 may be adjusted to have a flat profile even when it is secured to a non-flat support surface 110 or frame 202. In some examples, the anchors 112 may be adjusted by up to 20 millimeters in the z axis.

Figure 5A:
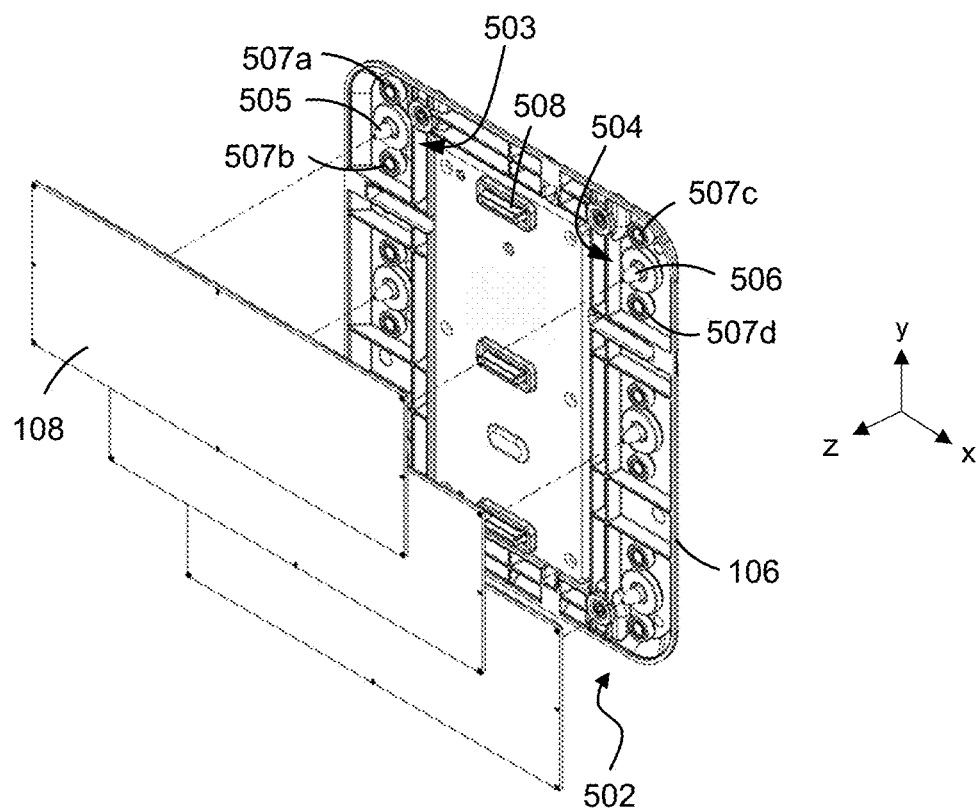
FIG. 5A is an exploded view of a chassis and a plurality of display tiles of the system of FIG. 1.

FIG. 5A shows an exploded view of the chassis 106 and display tiles 108 of FIG. 1. FIG. 5A also includes xyz Cartesian indicators to generally indicate direction. The chassis 106 has a front profile 502 adapted to receive display tiles 108. The front profile 502 of the chassis 106 has a plurality of locating features 503, 504 that are configured to locate one or more display tiles 108. In this example, the chassis 106 has three pairs of locating features corresponding with three display tiles 108, however a number of arrangements are available. The locating features 503, 504 on the front profile 502 may be male locating features or female locating features, and/or a combination thereof. The male locating features may comprise at least one locating pin. In the example shown, the locating features 503, 504 include male locating features, for example locating pins 505, 506. The locating pins 505, 506 may be disposed on an axis of the chassis 106. In the example shown in FIG. 5A, the two locating features 503, 504 are disposed on the x axis of the chassis 106. The orientation of the display tiles 108 when mounted may depend on the alignment of the locating features on the chassis.

Each chassis further comprises at least one magnetic coupler 507. Each magnetic coupler is adapted to magnetically couple with a magnetic coupler on a display tile 108. The magnetic couplers may comprise either a magnet or a ferromagnetic material. In one example, the chassis may have three magnetic couplers corresponding with three display tiles. In a further example, the chassis may have three pairs of magnetic couplers corresponding with three display tiles. In the example shown in FIG. 5A, twelve magnetic couplers 507a, 507b, 507c, 507d (interchangeably referred to hereafter, collectively, as the magnetic couplers 507 and, generically, as a magnetic coupler 507) are disposed on the chassis, with four magnetic couplers corresponding to each display tile 108.

The attractive strength of the magnetic couplers 507a, 507b, 507c, 507d is generally selected to be sufficient to secure the display tiles 108 when the display tiles 108 are mounted on the chassis 106. The strength of the magnets 507a, 507b, 507c, 507d may therefore depend on various factors including, but not limited to, a number of magnetic couplers corresponding to each display tile, an attitude of the mount sheet 102, a weight of the display tiles 108, and the like.

The magnetic couplers may position the display tiles in the z axis. Therefore, the outer surface of each magnetic coupler on the chassis is generally selected to be accurately aligned on an xy plane.

The chassis 106 may include one or more electrical connectors 508 to relay electrical signals to the display tiles 108.

Figure 5B:
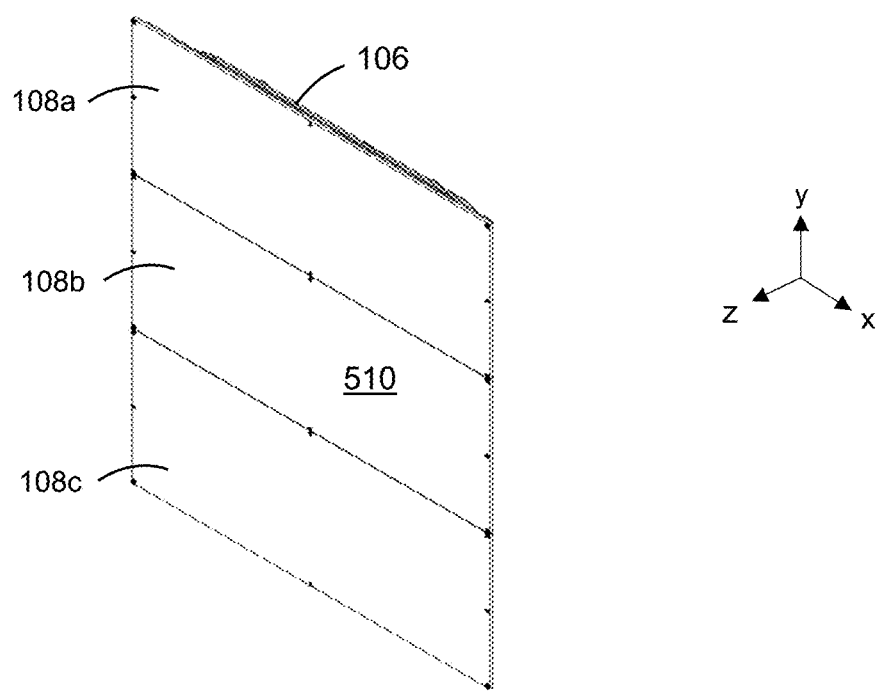
FIG. 5B is a perspective view of the chassis and display tiles of FIG. 1.

FIG. 5B shows the display tiles 108 of FIG. 5A mounted to the chassis 106. FIG. 5B also includes xyz Cartesian indicators to generally indicate direction. In this example, three display tiles 108 are mounted to the chassis 106. When mounted, the surface 510 of each display tile 108 may be approximately aligned on a xy plane and positions of the locating features 503, 504 may be selected to achieve given gaps between the display tiles 108 and/or given tolerances for such gaps, for example to minimize the gaps between neighboring display tiles 108 when mounted. In some examples, the positions of the locating features 503, 504 may be selected such that the gaps may be unnoticeable or imperceptible to an observer. For example, the inter-display tile gap may be about 0.1 cm. In other examples, the inter-display unit gap may be about 0.05 cm. In yet further examples, the inter-display gap may be about 0.01 cm. Additionally, the tolerances for the inter-display tile gap may minimal. In some examples, the tolerance may be about ±0.05 cm. In further examples, the tolerance may be about ±0.01 cm. In yet further examples, the tolerance may be about ±0.005 cm.

Figure 6A:
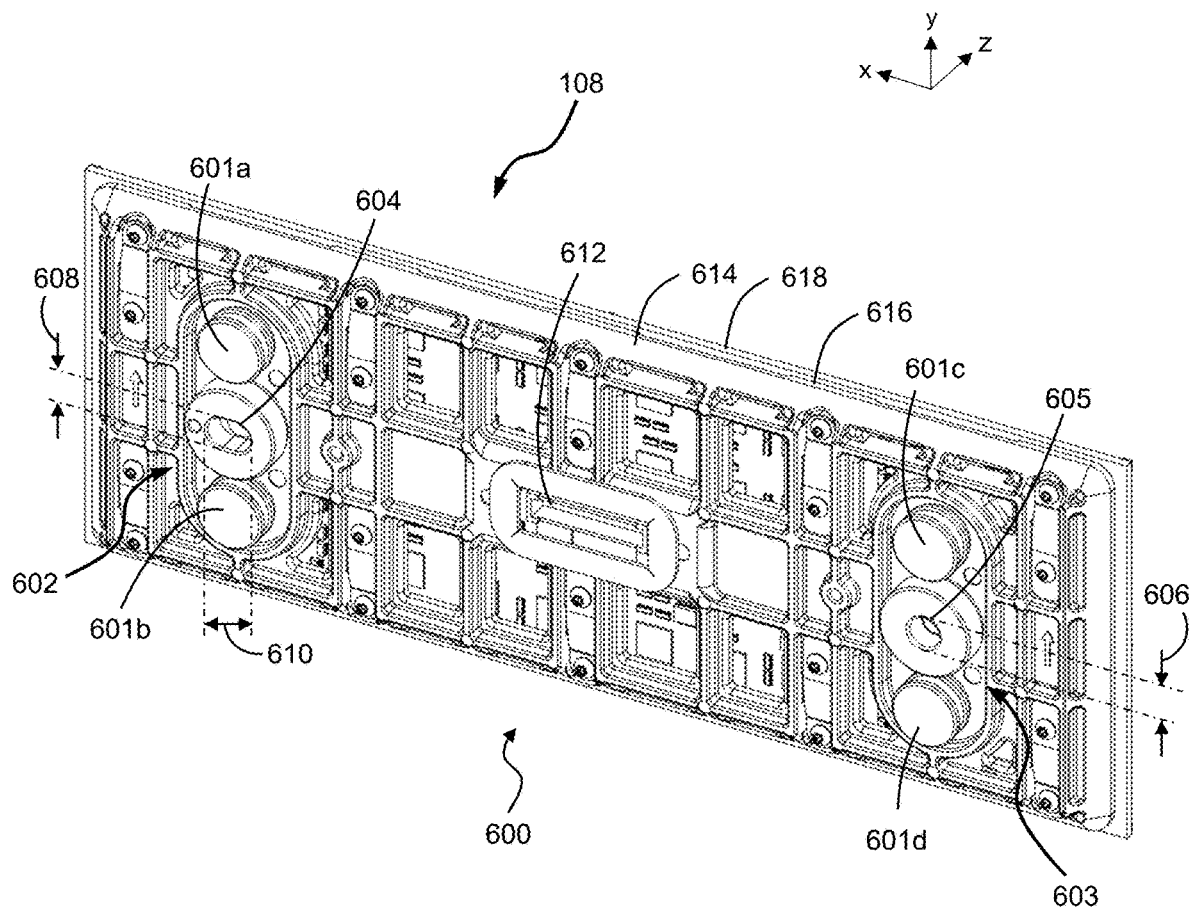
FIG. 6A is perspective rear view of a display tile of the system of FIG. 1.

FIG. 6A shows a rear view of a display tile 108 in perspective. FIG. 6A also includes xyz Cartesian indicators to generally indicate direction. The rear profile 600 of the display tile 108 includes at least one magnetic coupler 601a, 601b, 601c, 601d (interchangeably referred to hereafter, collectively, as the magnetic couplers 601 and, generically, as a magnetic coupler 601) adapted to couple with one or more magnetic couplers 507 on the chassis (shown previously in FIGS. 5A and 5B). The magnetic couplers 601 may comprise ferromagnetic material adapted to magnetically couple with magnets on the chassis 106. In another example, the magnetic couplers 601 may comprise magnets adapted to magnetically couple with ferromagnetic material on the chassis 106. The rear profile 600 may further include one or more locating features 602, 603, each corresponding with a locating feature 503, 504 on the chassis 106. The locating features 602, 603 may comprise male or female locating features and may be complementary to a corresponding locating feature 503, 504 on the chassis 106; for example, when a locating feature 602, 603 is female, a corresponding locating feature 503, 504 may be male. Furthermore, while the locating features 602, 603, 504, 504 are described herein as being "male" or "female" any suitable shapes of complementary locating features are within the scope of the present specification. In particular, in FIG. 6, the locating features 602, 603 are female, however a number of arrangements are possible. In general, a female locating feature 602, 603 on the display tile 108 is adapted to magnetically couple a corresponding male locating feature 503, 504 on the chassis 106, and a male locating feature 602, 603 on the display tile 108 is adapted to magnetically couple a corresponding female locating feature 602, 603 on the chassis 106 as further described hereafter.

A female locating feature 602, 603 may comprise at least one socket 604, 605 that is adapted to receive a corresponding locating pin 505, 507 of a male magnetic coupler 507 (previously shown in FIG. 5). FIG. 6 shows that each female magnetic coupler 602, 603 includes one socket 604, 605 disposed on an axis of the display tile 108 which facilitate locating the display tile 108 to the chassis 106 shown in FIGS. 5A and 5B. The sockets 604, 605 are shown to be aligned on the x axis of the display tile 108, however, a number of possible alignments are possible. In one example, the first socket 605 may comprise a hole socket, having an inner diameter 606. The second socket 604 may comprise a slot socket, having an inner width 610 and an inner height 608. The inner width 610 of the slot socket may comprise greater than the inner height 608 of the slot socket.

The display tile 108 may include one or more electrical adaptors 612.

The display tile 108 may include a carrier 614. The display tile 108 may additionally include a module board 616 which may be disposed on a surface of the carrier 614. The module board may comprise but is not limited to a polychlorinated biphenyl circuit board, drive electronics, and a plurality of LED pixels 618.

Figure 6B:
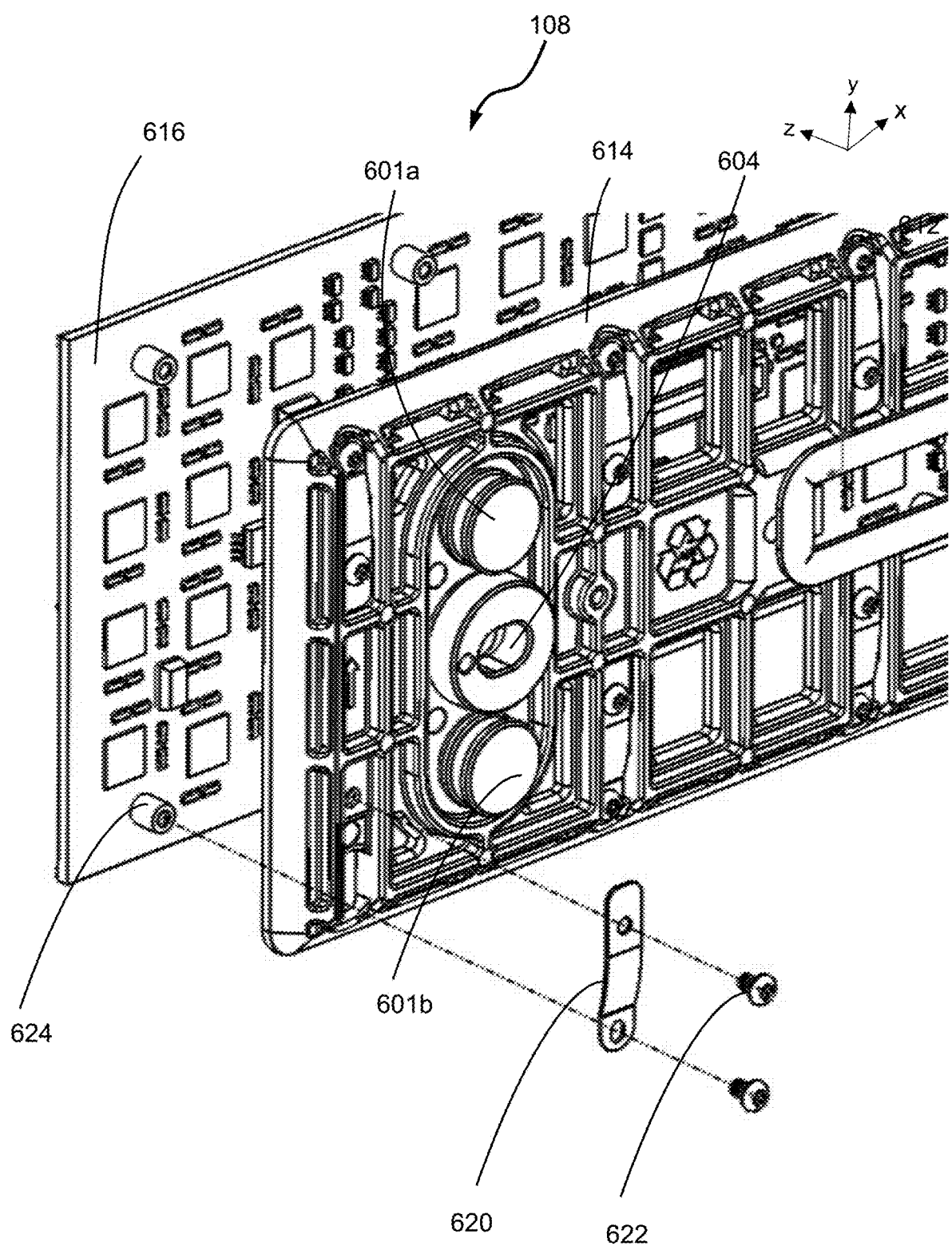
FIG. 6B is a partial exploded view of the display tile of FIG. 6B.

The surface of the carrier 614 may comprise a substantially planar and rigid structure. For example, the carrier may comprise of a rigid material such as metal. The carrier may be comprised of from a single piece of cast, formed, or machined metal. In configurations, whether the carrier is substantially planar and rigid, the carrier may provide structural support to the module board, when the module board 616 is disposed on the carrier. In some examples, the module board may be attached to the carrier with couplers, as shown in FIG. 6B. The couplers may include leaf springs 620 to reduce the amount of force that is imparted to the module board 616, ensuring that the module board is not damaged when attached to the carrier via screws 622 threaded into standoffs 624 on the module board. The standoffs 624 may be soldered on to the module board 616 for reduced resistance to bending or torque. The springs 620 control the amount of force that is applied to standoffs 624 when mounting the module board 616 to the carrier 614 (i.e. the springs deflect towards the standoff until they come in contact, ensuring a controlled amount of force is applied). In addition to eliminating torque from being placed on the standoffs 624 in response to tightening screws 622, the tensile load that the screws apply is counteracted by the contact between the spring 620 and the top of the standoff 624 (i.e. there is no 'pull' on the joint connecting the standoff 624 to the module board 616).

Figure 7:
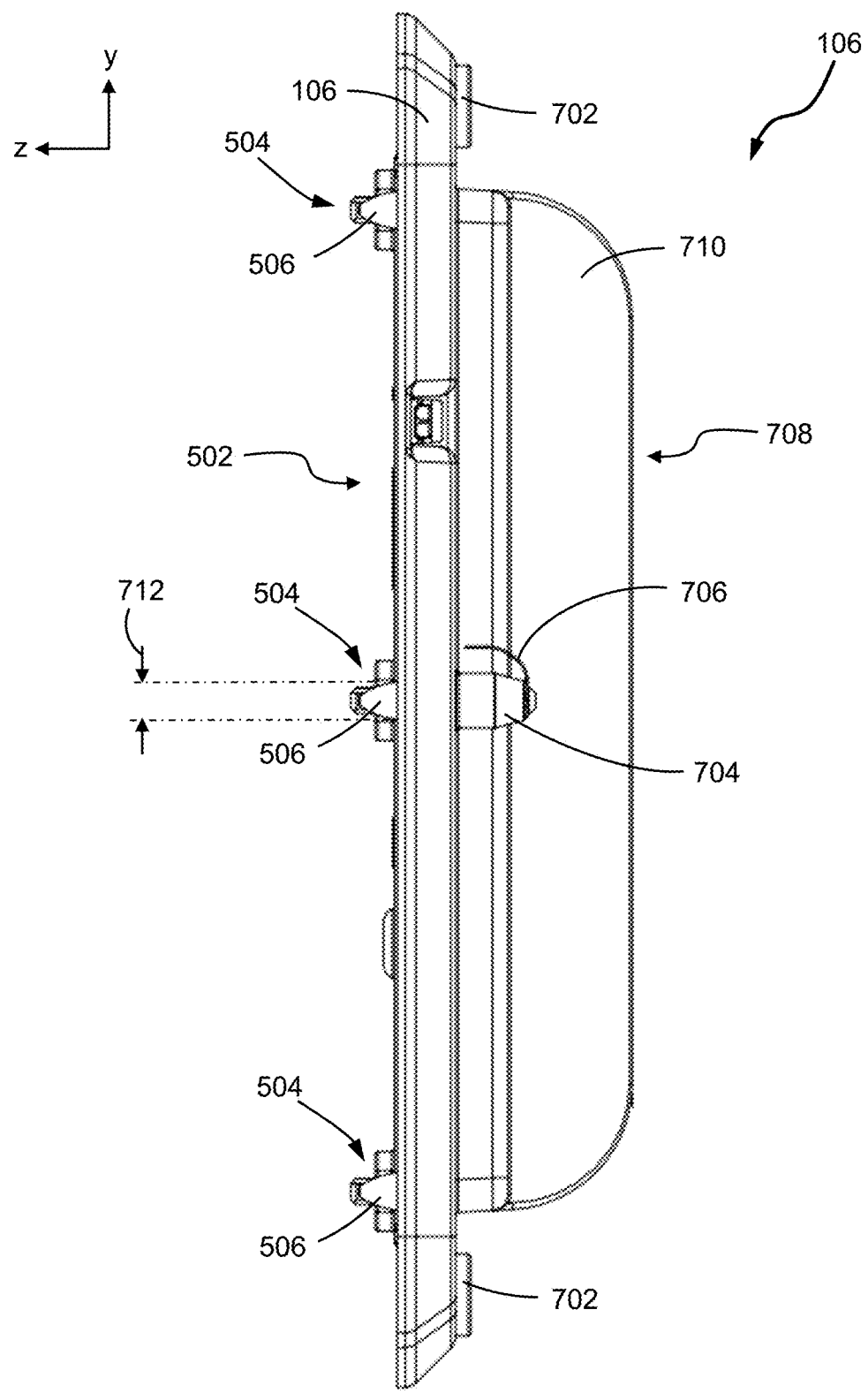
FIG. 7 is a side view of the chassis of FIG. 1.

FIG. 7 shows a side view of the chassis 106. FIG. 7 includes yz Cartesian indicators to generally indicate direction. The chassis 106 has a first side 502 adapted to magnetically couple at least one display tile (previously shown in FIG. 5A, 5B) and an opposite side 708 adapted to magnetically couple the mount sheet (previously shown in FIG. 1-3).

The chassis 106 may include at least one magnet 702 adapted to magnetically couple the mount sheet of FIG. 1. The chassis 106 may further include one or more locating pins 704 on the opposite side 708 for positioning the chassis 106 on the mount sheet of FIG. 1. One or more springs 706 may be connected to the locating pins 704.

In some examples, the magnets 702 may be dimensioned uniformly in the z axis such that the chassis 106 is substantially parallel to the mount sheet when the chassis 106 is mounted. The attractive strength of the magnet or magnets 702 may be selected to secure the chassis 106 to the mount sheet 102 of FIG. 1 when the chassis 106 is mounted to the mount sheet. The strength of the magnets 702 will therefore depend on a number of factors including, but not limited to, the number of magnets 702 on the opposite side, the attitude of the mount sheet, and the weight of the chassis 106.

The chassis 106 may be substantially planar. In some examples, a portion 710 of the chassis 106 may deviate from the substantially planar shape of the chassis 106. In some examples, the portion 710 of the chassis 106 may be disposed on the opposite side 708. In other examples, the portion 710 of the chassis 106 may be adapted to dissipate heat from the chassis 106. The portion 710 of the chassis 106 may have a shape adapted to increase the surface area of the chassis 106, for example, the portion 710 of the chassis 106 may have one or more fin-like structures. This shape may reduce or eliminate the need for a cooling mechanism such as forced air or fans.

The first side 502 of the chassis 106 includes at least one locating feature 504 adapted to locate the display tiles of FIGS. 5A and 5B. In the example shown in FIG. 7, the locating features 504 are male locating features, however the locating features 504 in other examples may comprise female locating features. The locating pins 505, 506 may have an outer diameter 712 adapted to couple and/or mate with a corresponding socket 604, 605 on the display tile 108. The locating pins 505, 506 may have a tapered shape such that the diameter of the locating pin is narrower at the distal end and wider at the proximal end, relative to the chassis or display tile, for example to assist with insertion of the locating pins 505, 506 into a respective socket 604, 605. The outer diameter referenced in this application may comprise maximum width of a locating pin 505, 506.

Figure 8:
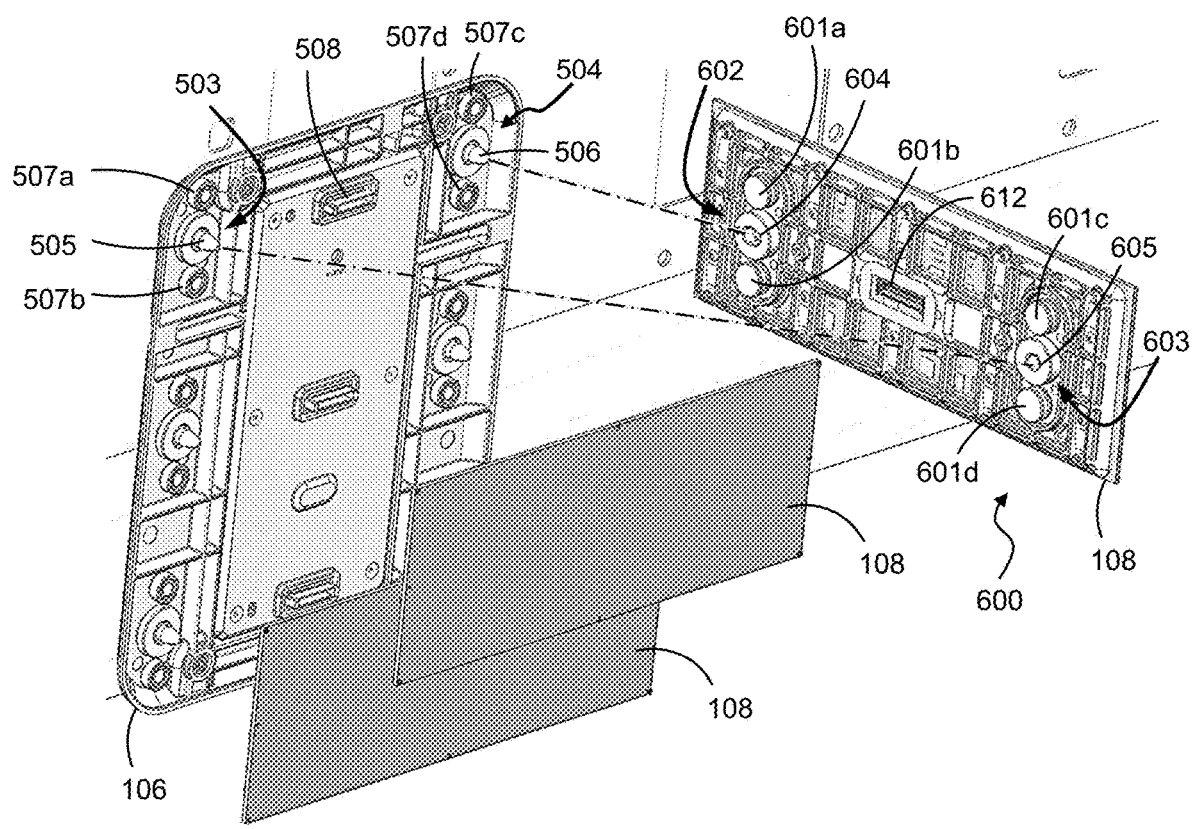
FIG. 8 an exploded view of the chassis and display tiles of FIG. 1.

FIG. 8 shows an exploded view of the chassis 106 and the display tiles 108. In this example, the chassis 106 includes male locating features 503, 504 corresponding with respective female locating features 602, 603 on the display tiles 108.

The outer diameter of a corresponding locating pin 505 may be dimensioned relative to the inner diameter 606 of the hole socket 605 (previously shown in FIG. 6) to create a close fit. The outer diameter 712 of a corresponding locating pin 506 may be dimensioned relative to the inner height 608 of the slot socket 604 (previously shown in FIG. 6) to create a close fit. The outer diameter 712 of the corresponding locating pin 506 may be less than the inner width 610 of the slot socket 604 (shown in FIG. 6). In this example, movement of the locating pin 506 is permitted in an axis of the display tile 108, but rotational movement of either socket 604, 605 around the corresponding locating pin 506, 505 is generally impeded when the display tile 108 is coupled to the chassis 106. This example permits components of the system 100 to expand and contract as the temperature fluctuates during operation.

In the example shown in FIG. 8, the magnetic couplers 507a, 507b, 507c, 507d on the chassis comprise magnets configured to engage respective ferromagnetic material of the magnetic couplers 601a, 601b, 601c, 601d on the display tile 108. In another example, the magnetic couplers 507a, 507b, 507c, 507d on the chassis may include ferromagnetic material configured to engage with respective magnets of the magnetic couplers 601a, 601b, 601c, 601d on the display tile, with respective polarities selected accordingly.

The chassis 106 may include one or more electrical connectors 508, and the display tiles 108 may include one or more electrical adaptors 612. When the display tile 108 is mounted on the chassis 106, the electrical connectors 508 may be configured to engage with one or more electrical adaptors 612.

Figure 9:
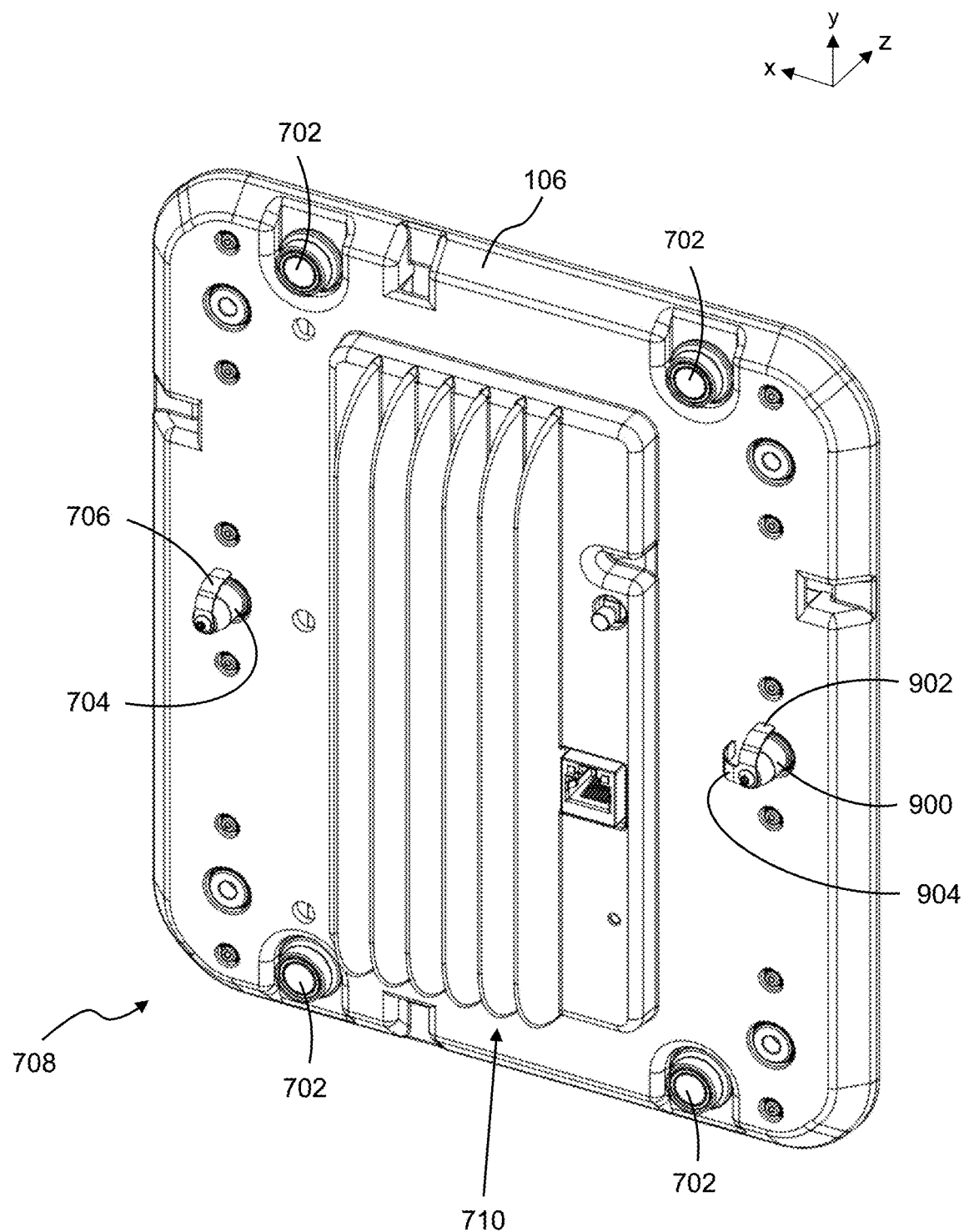
FIG. 9 is a perspective view of the chassis of FIG. 1.

FIG. 9 shows a perspective view of the rear profile 708 of the chassis 106. FIG. 9 includes xyz Cartesian indicators to generally indicate direction. The chassis 106 includes one or more magnets 702 adapted to magnetically couple the mount sheet 102 from FIG. 1. The chassis 106 may further include one or more locating pins 704, 900 for positioning the chassis 106 on the mount sheet of FIG. 1. The opposite side 708 of the chassis 106 may include two locating pins 704, 900 disposed on an axis of the chassis 106. One or more springs 706, 902, 904 may be connected to the locating pins 704, 900.

In the example illustrated in FIG. 9, the opposite side 708 of the chassis 106 includes two locating pins 704, 900 disposed on the x axis of the chassis 106. Two springs 902, 904 may be connected to the first locating pin 900. The two springs 902, 904 may be connected to the first locating pin 900 in a number of ways including, but not limited to, a fastener or an adhesive. A further spring 706 is connected to the second locating pin 704. The spring 706 may be connected to the second locating pin 704 in a number of ways including, but not limited to, a fastener or an adhesive.

Figure 10:
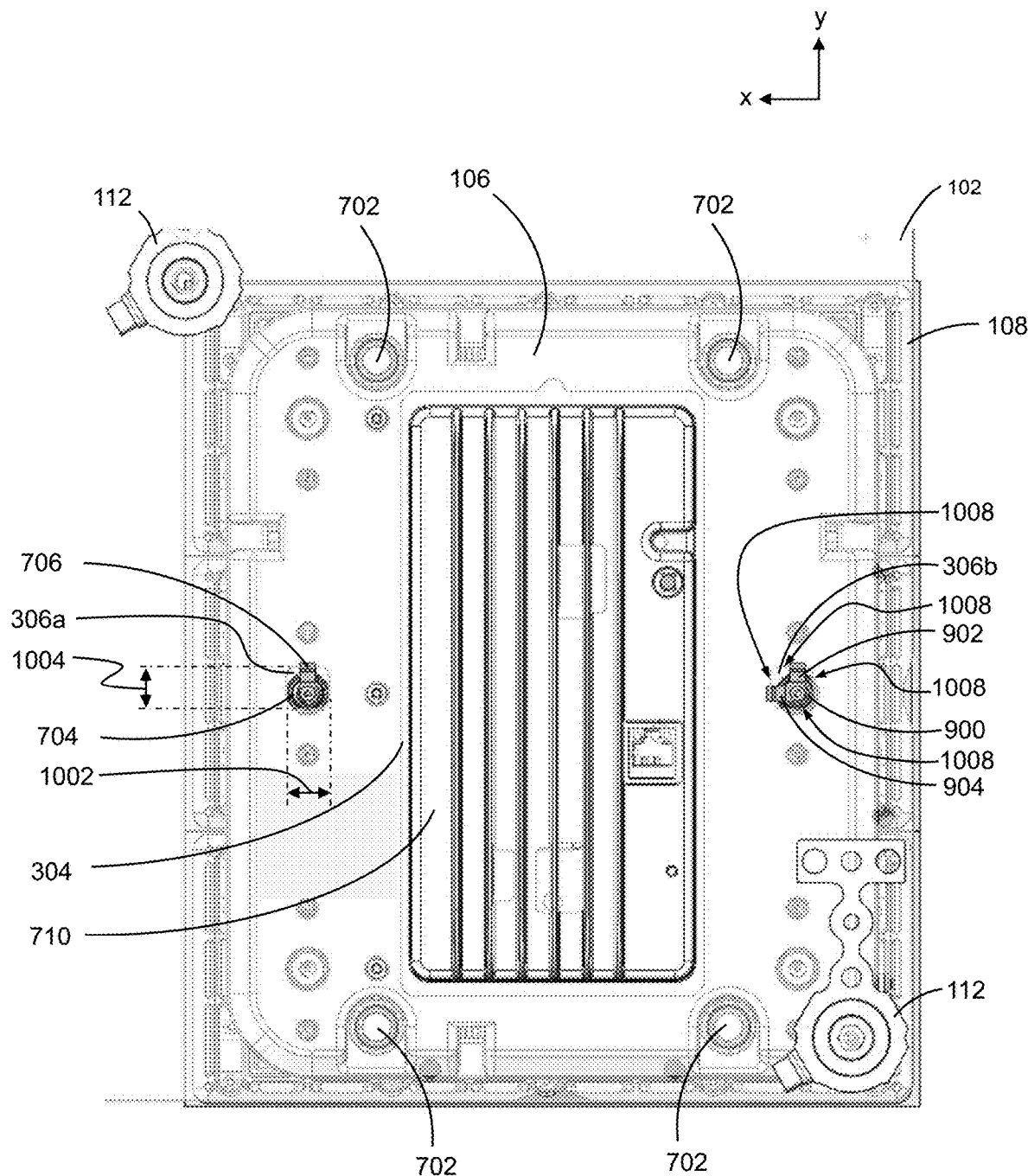
FIG. 10 is a partial rear view showing the chassis mounted on the mount sheet of the system of FIG. 1.

FIG. 10 shows a rear view of the system 100 of FIG. 1. FIG. 10 includes yz Cartesian indicators to generally indicate direction. The mount sheet 102 is depicted as partially transparent so as to better show the mounting of the chassis 106 on the mount sheet 102. Anchors 112 may be removably attached to the mount sheet 102. A portion 710 of the chassis 106 may be received by a cut-out in the mount sheet 304.

The chassis 106 may be magnetically coupled to the mount sheet 102 with at least one magnet 702. The chassis 106 may also comprise one or more locating pins 704, 900 on the opposite side for positioning the chassis relative one or more locating edges 1000 of a corresponding aperture 306a, 306b in the mount sheet 102. The locating edges 1000 may be defined by the inner edge or edges of each aperture 306a, 306b. In some examples, the apertures may be rectangular or square. In these instances, for example FIG. 10, the apertures may have four locating edges 1000. In yet other examples, the apertures may have rounded corners.

In the example depicted in FIG. 10, the chassis 106 is mounted on the mount sheet 102 with four magnets 702 and two locating pins 704, 900, however any number of magnets and locating pins is contemplated. In the example shown in FIG. 10, the two locating pins 704, 900 are disposed on the x axis of the chassis 106. The second locating pin 704 corresponds with one aperture 306a in the mount sheet 102, and the first locating pin 900 corresponds with a second aperture 306b. Each aperture 306a, 306b may have an inner width 1002 and an inner height 1004. The outer diameter of the corresponding locating pin (shown previously as 712 in FIG. 7) may be less than the inner width 1002 and the inner height 1004 of the corresponding aperture 306a, 306b. In this example, the corresponding apertures 306a, 306b may receive the locating pins 704, 900 when the chassis 106 is magnetically coupled to the mount sheet 102.

The locating pins may have a tapered shape such that the diameter of the locating pin is narrower at a distal end and wider at a proximal end, relative to the chassis or display tile. The outer diameter 712 referenced in this application is the maximum width of the locating pin.

Two springs 902, 904 may be connected to the first locating pin 900. The first spring 902 on the first locating pin 900 may be configured to bias the first locating pin 900 in a direction perpendicular to the axis. In the example in FIG. 10, the first spring 902 on the first locating pin 900 is configured to bias the locating pin 900 in they axis of the chassis 106. The first spring 902 on the first locating pin 900 may bias the first locating pin 900 by exerting a pressure against one of the locating edges 1000. The second spring 904 on the first locating pin 900 may be configured to bias the first locating pin 900 in the direction of an axis. In the example in FIG. 10, the second spring 904 on the first locating pin 900 is configured to bias the first locating pin 900 in the x axis of the chassis 106. The second spring 904 on the first locating pin 900 may bias the first locating pin 900 by exerting a pressure against one of the locating edges 1000. A further spring 706 may be connected to the second locating pin 704. The further spring 706 may be configured to bias the second locating pin 704 in a direction perpendicular to the axis. In the example in FIG. 10, the further spring 706 is configured to bias the second locating pin 704 in the y axis of the chassis 106. The further spring 706 may bias the second locating pin 704 by exerting a pressure against the mount sheet 102.

In this example, movement of the second locating pin 704 is permitted in the direction of an axis, and rotational movement of the chassis 106 around the apertures 704, 900 is impeded. In the example depicted in FIG. 10, the second locating pin 704 may be configured to move in the x axis, but rotational movement of the chassis 106 around either aperture 306a, 306b may be impeded. This example may address the challenge of accurately locating the chassis 106 on a mount position 104. This example may additionally permit components of the system 100 to expand and contract as the temperature of the system fluctuates during operation.

In some examples, the springs 902, 904, 706 may comprise leaf springs. In a further example, the springs may comprise elastomers. In a yet further example, the springs may comprise coil springs. In another example, the springs may comprise a combination of leaf springs, coil springs, and/or elastomers.

Although the examples set forth in the drawings and discussed herein are directed to mounting display tiles in a modular video system, the coupler discussed herein may be used to couple panels other than display tiles in applications other than modular video systems. For example, it is contemplated that the male/female locating features and magnetic couplers described herein may be used to mount disparate objects such as automotive panels, picture frames, and other panels to surfaces, without limitation.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Features and advantages will be apparent from the detailed specification and, thus, it is intended by the appended claims to cover all such features and advantages of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the claims.

We claim:

1. A system for mounting a plurality of display tiles, the system comprising:
   a mount sheet having a plurality of mounting positions; and
   a plurality of chassis, at least one chassis having at least one locating feature on one side adapted to locate at least one locating feature on at least one of the plurality of display tiles, at least one magnetic coupler on one side adapted to magnetically couple at least one magnetic coupler on at least one of the plurality of display tiles, and at least one magnet on an opposite side adapted to magnetically couple the mount sheet in one of the mounting positions, wherein the at least one chassis further includes at least one locating pin on the opposite side for positioning the at least one chassis relative to at least one locating edge of at least one aperture in the mount sheet.

2. The system of claim 1, wherein the at least one magnetic coupler on at least one chassis is at least one of either a first magnet or a first ferromagnetic material, and the at least one magnetic coupler on at least one of the display tiles is at least one of either a second magnet or a second ferromagnetic material.

3. The system of claim 1, wherein the at least one locating feature on one side is one of either a male locating feature or a female locating feature adapted to locate the at least one female locating feature or male locating feature, respectively, on the at least one display tile.

4. The system of claim 3:
   wherein the male locating feature comprises at least one locating pin; and
   wherein the female locating feature comprises at least one socket that is adapted to receive the at least one locating pin.

5. The system of claim 4,
   wherein the at least one display tile has two locating features corresponding with two of the at least one locating feature on the at least one chassis;
   wherein the two female locating features include first and second ones of said at least one socket disposed on an axis, the first socket being a hole socket and the second socket being a slot socket, the hole socket having an inner diameter and the slot socket having an inner height and an inner width; and
   wherein the two male locating features include first and second ones of said at least one locating pin having an outer diameter and adapted to locate a corresponding one of the first and second sockets of the two female locating features.

6. The system of claim 5:
   wherein the inner diameter of the hole socket is dimensioned relative to the outer diameter of the corresponding locating pin to create a close fit;
   wherein the inner height of the slot socket is dimensioned to the outer diameter of the corresponding locating pin to create a close fit; and
   wherein the inner width of the slot socket is greater than the outer diameter of the corresponding locating pin;
   such that movement of the locating pin coupled with the slot socket is permitted in the axis, and rotational movement of either of the first and second sockets around the corresponding locating pins is impeded.

7. The system of claim 3, wherein the at least one locating feature on the at least one chassis is a male locating feature, and the at least one locating feature on the at least one display tile is a female locating feature.

8. The system of claim 1:
   wherein the at least one locating pin on the opposite side of the at least one chassis has an outer diameter and corresponds with one of the at least one aperture on the mount sheet, the at least one aperture having an inner width and an inner height; and
   wherein the outer diameter is less than the inner width and the inner height of the at least one corresponding aperture.

9. The system of claim 8, wherein the at least one chassis has two locating pins on the opposite side, the two locating pins being disposed on an axis of the chassis.

10. The system of claim 9 further comprising:
- two springs connected to the first locating pin on the opposite side of the at least one chassis, the first of the two springs configured to bias the first locating pin in a direction perpendicular to the axis, and the second of the two springs configured to bias the first locating pin in the axis; and
- a further spring connected to the second locating pin on the opposite side of the at least one chassis and configured to bias the second locating pin in a direction perpendicular to the axis;
- such that movement of the second locating pin on the opposite side of the at least one chassis is permitted in the axis, and rotational movement of the at least one chassis around either of the two locating pins is impeded;
- and such that the first locating pin engages one locating edge of the corresponding aperture, and the second locating pin engages two locating edges of the corresponding aerture.

11. The system of claim 10, wherein the springs may be selected from a group comprising elastomers, leaf springs, coil springs, or a combination thereof.

12. The system of claim 1, wherein the at least one display tile includes a carrier and a module board.

13. A system for mounting a plurality of display tiles, the system comprising:
- a mount sheet having a plurality of mounting positions; and
- a plurality of chassis, at least one chassis having at least one locating feature on one side adapted to locate at least one locating feature on at least one of the plurality of display tiles, at least one magnetic coupler on one side adapted to magnetically couple at least one magnetic coupler on at least one of the plurality of display tiles, and at least one magnet on an opposite side adapted to magnetically couple the mount sheet n one of the mounting positions, wherein the at least one chassis includes:
  - three pairs of locating features adapted to locate with corresponding pairs of locating features on three display tiles; and
  - three magnetic couplers adapted to magnetically couple with the magnetic couplers on three display tiles.

14. The system of claim 13, wherein the at least one magnetic coupler on at least one chassis is at least one of either a first magnet or a first ferromagnetic material, and the at least one magnetic coupler on at least one of the display tiles is at least one of either a second magnet or a second ferromagnetic material.

15. The system of claim 13, wherein the at least one locating feature on one side is one of either a male locating feature or a female locating feature adapted to locate the at least one female locating feature or male locating feature, respectively, on the at least one display tile.

16. The system of claim 15:
- wherein the male locating feature comprises at least one locating pin; and
- wherein the female locating feature comprises at least one socket that is adapted to receive the at least one locating pin.

17. The system of claim 16,
- wherein the at least one display tile has two locating features corresponding with two of the at least one locating feature on the at least one chassis;
- wherein the two female locating features include first and second ones of said at least one socket disposed on an axis, the first socket being a hole socket and the second socket being a slot socket, the hole socket having an inner diameter and the slot socket having an inner height and an inner width; and
- wherein the two male locating features include first and second ones of said at least one locating pin having an outer diameter and adapted to locate a corresponding one of the first and second sockets of the two female locating features.

18. The system of claim 17:
- wherein the inner diameter of the hole socket is dimensioned relative to the outer diameter of the corresponding locating pin to create a close fit;
- wherein the inner height of the slot socket is dimensioned to the outer diameter of the corresponding locating pin to create a close fit; and
- wherein the inner width of the slot socket is greater than the outer diameter of the corresponding locating pin;
- such that movement of the locating pin coupled with the slot socket is permitted in the axis, and rotational movement of either of the first and second sockets around the corresponding locating pins is impeded.

19. The system of claim 15, wherein the at least one locating feature on the at least one chassis is a male locating feature, and the at least one locating feature on the at least one display tile is a female locating feature.

20. The system of claim 13, wherein the at least one display tile includes a carrier and a module board.

21. A system for mounting a plurality of display tiles, the system comprising:
- a mount sheet having a plurality of mounting positions; and
- a plurality of chassis, at least one chassis having at least one locating feature on one side adapted to locate at least one locating feature on at least one of the plurality of display tiles, at least one magnetic coupler on one side adapted to magnetically couple at least one magnetic coupler on at least one of the plurality of display tiles, and at least one magnet on an opposite side adapted to magnetically couple the mount sheet in one of the mounting positions, wherein the mount sheet is removably attached to a support surface with one or more anchors, and wherein the one or more anchors are positioned between the mount sheet and the support surface.

22. The system of claim 21, wherein the at least one magnetic coupler on at least one chassis is at least one of either a first magnet or a first ferromagnetic material, and the at least one magnetic coupler on at least one of the display tiles is at least one of either a second magnet or a second ferromagnetic material.

23. The system of claim 21, wherein the at least one locating feature on one side is one of either a male locating feature or a female locating feature adapted to locate the at least one female locating feature or male locating feature, respectively, on the at least one display tile.

24. The system of claim 23:
- wherein the male locating feature comprises at least one locating pin; and
- wherein the female locating feature comprises at least one socket that is adapted to receive the at least one locating pin.

25. The system of claim 24,
- wherein the at least one display tile has two locating features corresponding with two of the at least one locating feature on the at least one chassis;

wherein the two female locating features include first and second ones of said at least one socket disposed on an axis, the first socket being a hole socket and the second socket being a slot socket, the hole socket having an inner diameter and the slot socket having an inner height and an inner width; and wherein the two male locating features include first and second ones of said at least one locating pin having an outer diameter and adapted to locate a corresponding one of the first and second sockets of the two female locating features.

26. The system of claim 25:

wherein the inner diameter of the hole socket is dimensioned relative to the outer diameter of the corresponding locating pin to create a close fit;

wherein the inner height of the slot socket is dimensioned to the outer diameter of the corresponding locating pin to create a close fit; and wherein the inner width of the slot socket is greater than the outer diameter of the corresponding locating pin;

such that movement of the locating pin coupled with the slot socket is permitted in the axis, and rotational movement of either of the first and second sockets around the corresponding locating pins is impeded.

27. The system of claim 21, wherein the at least one display tile includes a carrier and a module board.

28. A system for mounting a plurality of display tiles comprising:

a mount sheet having a plurality of mounting positions; and a plurality of chassis, wherein, the at least one display tile has two locating features on one side adapted to locate two of at least two locating features on the chassis;

wherein the two locating features on one side are one of either male locating features or female locating features adapted to locate two female locating features or two male locating features, respectively, on the display tile;

wherein each male locating feature comprises a locating pin;

wherein each female locating feature comprises a socket that is adapted to receive the locating pin; and wherein each chassis includes a magnet or a ferromagnetic material adapted to magnetically couple with a ferromagnetic material or magnet, respectively, on the display tile;

wherein the two female locating features include either a first or second one of said socket disposed on an axis, the first socket being a hole socket and the second socket being a slot socket, the hole socket having an inner diameter and the slot socket having an inner height and an inner width;

wherein the two male locating features include either a first or second one of said locating pin having an mater diameter and adapted to couple with a corresponding one of the first or second sockets of the female locating features;

wherein the inner diameter of the hole socket is dimensioned relative to the outer diameter of the corresponding locating pin to create a close fit;

wherein the inner height of the slot socket is dimensioned relative to the outer diameter of the corresponding locating pin to create a close fit; and wherein the inner width of the slot socket is greater than the outer diameter of the corresponding locating pin;

such that movement of the locating pin coupled with the slot socket is permitted in the axis, and rotational movement of either of the first and second sockets around the corresponding locating pins is impeded; and wherein the at least one chassis has two locating pins on the opposite side for positioning the at least one chassis relative to at least one locating edge of two apertures in the mount sheet;

wherein each locating pin corresponds with one of the two apertures on the mount sheet, each locating pin having an outer diameter and being disposed on the chassis in an axis;

wherein each aperture has an inner width and an inner height; and wherein the outer diameter is less than the inner width and the inner height of the corresponding aperture.

29. The system of claim 28 further comprising:

two springs connected to the first locating pin on the opposite side of the at least one chassis, the first of the two springs configured to bias the first locating pin in a direction perpendicular to the axis, and the second of two springs configured to bias the first locating pin in the axis; and a further spring connected to the second locating pin on the opposite side and configured to bias the second locating pin in a direction perpendicular to the axis; and such that movement of the second locating pin on the opposite side of the at least one chassis is permitted in the axis, and rotational movement of the at least one chassis around either of the two locating pins is impeded; and such that the first and second locating pins engage at least one locating edge of the corresponding aperture.

30. The system of claim 23, wherein the at least one locating feature on the at least one chassis is a male locating feature, and the at least one locating feature on the at least one display tile is a female locating feature.

\* \* \* \* \*